United States Patent [19]

Hasegawa et al.

[11] Patent Number: 4,818,340

[45] Date of Patent: Apr. 4, 1989

[54] ENVELOPE TYPE SEPARATOR FOR STORAGE BATTERY AND MANUFACTURING PROCESS THEREFOR

[75] Inventors: Takao Hasegawa; Hideo Endo, both of Gifu, Japan

[73] Assignee: Nihon Muki Kabushiki Kaisha, Tokyo, Japan

[21] Appl. No.: 783,873

[22] Filed: Oct. 3, 1985

Related U.S. Application Data

[62] Division of Ser. No. 514,098, Jul. 15, 1983, abandoned.

[30] Foreign Application Priority Data

Jul. 15, 1982 [JP] Japan ................................. 52-122175

[51] Int. Cl.$^4$ .............................................. D21H 1/02
[52] U.S. Cl. .................................... 162/125; 162/128; 162/129; 162/138; 162/146
[58] Field of Search ................ 162/125, 128, 129, 146, 162/130

[56] References Cited

U.S. PATENT DOCUMENTS

| | | | |
|---|---|---|---|
| 3,158,532 | 11/1964 | Pall et al. | 162/146 |
| 3,238,056 | 3/1966 | Pall et al. | 162/146 |
| 3,573,158 | 3/1971 | Pall et al. | 162/146 |
| 4,387,144 | 6/1983 | McCallum et al. | 162/146 |

*Primary Examiner*—Peter Chin
*Attorney, Agent, or Firm*—Abelman Frayne Rezac & Schwab

[57] ABSTRACT

The present invention resides in an envelope type separator for a storage battery and the manufacturing process thereof. The separator sheet is comprised of a first, microporous paper layer made of an inorganic powder material, a synthetic organic fiber material and an organic binder, and a second, coarse paper layer made of a synthetic organic fiber material and an organic binder, but no inorganic powder material, these layers being bound together by heating. The resultant separator sheet of combination paper type is then formed so that the mutually inward surfaces of the coarse paper layer are brought into contact with each other and are made to adhere to each other, preferably at the edges, by thermal fusion, so that the separator sheet is formed into the shape of an envelope process for making an envelope type separator sheet is also described.

1 Claim, 1 Drawing Sheet

ENVELOPE TYPE SEPARATOR FOR STORAGE BATTERY AND MANUFACTURING PROCESS THEREFOR

This is a division of application Ser. No. 514,098 filed July 15, 1983 now abandoned.

The present invention resides in an envelope type separator for a storage battery and the manufacturing process thereof. The separator sheet is comprised of a first, microporous paper layer made of an inorganic material, a synthetic organic fiber material and an organic binder, and a second, coarse paper layer made of a synthetic organic fiber material and an organic binder, but no inorganic powder material, these layers being bound together by heating. The separator sheet is then formed so that the mutually inward surface of the coarse layer are brought into contact with each other and are made to adhere to each other, preferably at the edges, by thermal fusion, so that the separator sheet is formed into the shape of an envelope. A process for making the envelope type separator sheet is also described.

More specifically, the present invention provides for an envelope type separator for a storage battery characterised in that said separator comprises a combination paper type separator sheet wherein a microporous layer, made of an inorganic powder material, a synthetic organic fiber material and an organic binder, and a coarse paper layer, which is made of a synthetic organic fiber material and an organic binder and which contains no inorganic powder material, are combined together by a paper-making process and brouned together by heating, and the mutually inward facing surfaces of the coarse sheet layer of the sheet are placed one upon another, and are adhered to each other by thermal fusion so that the sheet may be formed into the shape of an envelope.

It also provides a process for preparing an envelope type separator for a storage battery characterised in that a wet microporous paper layer, made of a mixture of an inorganic powder material, a synthetic organic fiber material and a synthetic organic pulp material, and a wet coarse paper layer, which is made of a mixture of a synthetic organic fiber material and a synthetic organic pulp material and which contains no inorganic powder material, are combined together by a paper-making process and the resultant combination wet sheet is heated to affect drying and binding through fusion of the synthetic pulp binder materials, thereby producing a combination paper type separator sheet, which is an integral combination of the microporous paper layer containing the inorganic powder material and the coarse paper layer containing no inorganic powder material, said coarse paper layer being comparatively large in pore diameter and thus in porosity, said separator sheet being folded so that the mutually inward facing surfaces of the coarse paper layer are placed one upon another, and then adhered together by melting of the pulp materials by thermal fusion at predetermined locations thereof so that the sheet may be formed into the shape of a bag or envelope.

DETAILED DESCRIPTION OF THE INVENTION

This invention relates to an envelope type separator for a storage battery which is soft and tough, and also has oxidation-resisting properties.

As for an envelope type separator of this kind, there has higherto been known a type produced by a process wherein a mixture of a synthetic fiber material, a synthetic pulp material and an inorganic powder material is made into a sheet by a paper-making process, the sheet is folded into two and the two halves are adhered together by thermal fusion at the mutually inward facing surfaces of the edge portions thereof so as to be formed into a bag-shaped separator. This prior art separator, however, is defective in that, when vibrations, shock, friction, gas pressure or the like is applied to it in the course of a battery manufacturing process, such as when an electrode is put therein and a number of electrodes are assembled with a number of electrode plates of opposite polarity to be formed into a battery in a battery casing, or during use of the battery, the thermal fusion adhesion portion of the envelope type separator peels off or is broken and thus is liable to lack in reliability in prevention of a short circuit between the electrode plates. One of the causes of this rupturing is that the inorganic powder material which has been mixed in the prior art film type separator, in order to improve the oxidation-resisting property of the separator, offers obstruction to good thermal fusion adhesion between the mutually facing surfaces thereof on forming the separator sheet into the envelope shape. Another cause is that the inorganic material contained in the separator results in an inferior bending strength, that is, a poor folding endurance, at the bent portion of the envelope separator.

The present invention provides an envelope type separator for a storage battery which is free from the foregoing defects, while possessing a good oxidation-resisting property compared to the foregoing conventional envelope type separator. It is characterized in that it comprises a combination paper type separator sheet prepared by using a microporous paper layer having an inorganic powder material, a synthetic organic fiber material and an organic binder contained therein and a second, coarse paper layer which contains a synthetic organic fiber material and an organic binder, and which contains no inorganic powder material, combining these two paper layers together by a paper-making process and binding them to each other by heating, wherein the sheet is formed into an envelope shape one by bringing the mutually inward facing surfaces of the coarse paper layers, containing no inorganic powder material, together, and adhering these surfaces to each other, generally at the edges by thermal fusion so that the sheet is formed into the shape of an envelope.

GENERAL EXPLANATION OF DRAWINGS

Figure 1:
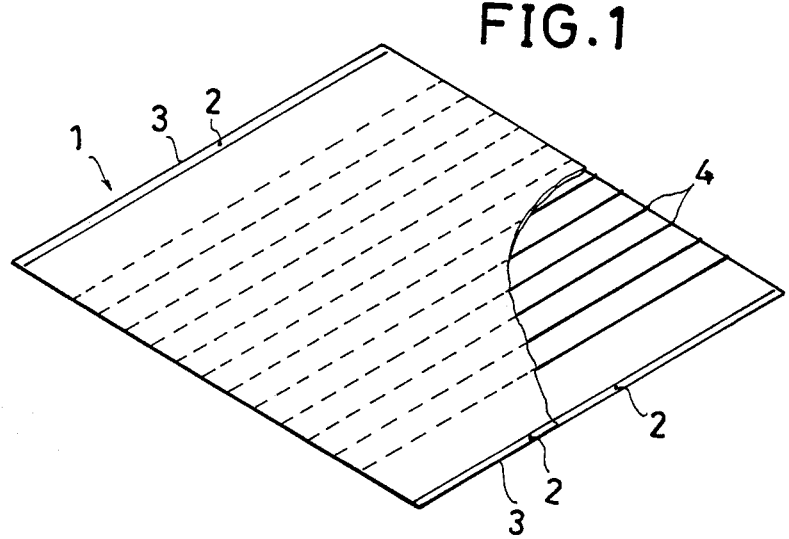
Figure 2:
Figure 3:
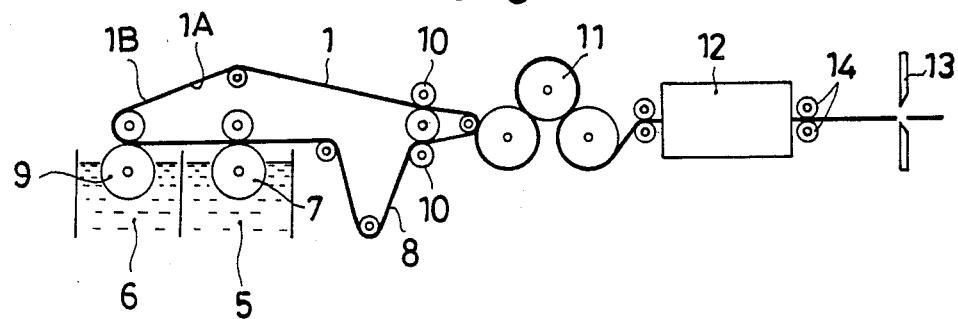

FIG. 1 is a partial perspective view, of one example of this invention envelope shaped combination paper type separator, FIG. 2 is an enlarged sectional view of part thereof, and FIG. 3 is a diagram showing one example of this invention envelope type separator manufacturing process.

DETAILED DESCRIPTION OF DRAWINGS

Embodying examples of this invention will now be explained with reference to the accompanying drawings:

FIGS. 1 and 2 show one example of the envelope type separator of this invention. This envelope type separator comprises a paper type separator sheet 1 made from a microporous paper layer 1a containing an inorganic powder material a, a synthetic organic pulp as a binder, and a paper layer 1b which is made of a synthetic organic fiber material and an organic binder of a synthetic pulp, without inorganic powder material. Accordingly, said coarse paper layer is larger in pore diameter in microporosity than the layer 1a owing to the absence of inorganic powder material, and is called hereinafter "coarse paper layer". These paper layers are combined together by a paper-making process and are then bound together by a heat treatment, and the resultant combination-paper type separator sheet 1 is then folded into two, with the coarse paper layer 1b thereof being inside. The mutally facing coarse paper layers 1b, 1b thereof are put one upon another so that the surfaces thereof are brought into contact with each other, and are adhered by thermal fusion at both side edges 2, 2 and 2, 2 thereof. Numeral 3 denotes a thermal fusion portion. If occasion demands, the envelope-shaped separator may be provided on mutually inward facing surfaces thereof, with a large number of lengthwise directional parallel ribes 4, 4 . . . formed previously by means of a press embossing process on the separator sheet or by attaching parallel synthetic resin made ribs, as by a bonding agent, to the surface of the coarse layer of the separator sheet, whereby there are left a large number of lengthwise directional liquid flowing spaces between the envelope separator 1 and both side surfaces of an electrode plate contained therein.

Thus, the envelope type separator 1 of this invention comprises an envelope type separator formed by the thermal fusion adhesion portions 3, 3 between the coarse paper layers 1b, 1b, said coarse paper layer containing no inorganic powder material, so that the peeling strength, i.e., the friction pull strength or an adhesion strength, of the thermal fusion adhesion portion 3, is extremely improved in comparison with that of the foregoing conventional envelope type separator, and at the same time the bending strength, that is, the folding endurance, of the bent portion thereof is also greatly improved, as shown in the comparison results described below. Additionally, the separator has good oxidation resisting properties, substantially equal to the conventional bag-shaped separator at its outer layer microporous paper layer is containing the inorganic material a. The fine pores of the coarse paper layer 1b containing no inorganic powder material are comparatively large in pore diameter, so that the electric resistance value of the whole of the separator 1 can be retained entirely or substantially equal to the electric resistance value of a separator comprising the microporous paper layer 1a alone, and accordingly that of the conventional separator. If the layer 1b is decreased in its unit amount and consequently is formed into a coarse paper layer with extremely large pores, any increase in the electric resistance value of the separator can surely be prevented.

Though not illustrated, the separator of this invention may be modified into an envelope type separator by means of an additional coarse paper layer containing no inorganic powder material, being combined, by a paper-making process, to the outer surface of the microporous paper layer 1a, and thereby the bending strength, the toughness and other properties thereof can be further increased.

The inorganic powder material is any kind of inorganic powder or inorganic fine fiber or a mixture thereof. As for the inorganic powder, one or more kinds of silica, calcium siliate, kaoline, clay, talc, diatomaceous earth, etc. may be used. As for the inorganic fine fiber, one kind or more kinds of fine glass fiber, rock wool, fine asbestos fiber, etc. may be used.

As for the synthetic organic fiber material, at least one kind of the polyester series, polyacrylonitrile series, polyolefin series, polyvinyl chloride series, or phenol resin series may be used. It is preferable that it is 0.5–5 denier in thickness and 3–10 mm in length. The binder is generally a synthetic resin binder. For instance, as for the synthetic organic pulp binder, pulps of the polyolefin series, and preferably among them, especially any pulp of polyethylene, polypropylene, polybutadiene or a intercopolymer thereof can be used. However, any other kind of pulp may be used, and it is, in general, that any pulp which is lower in its melting point than the foregoing synthetic fiber material can be ued. In respect of the polyethylene pulp, one which is below 6 in melt-index is generally used, and a melt-index which is below 2 is preferably used from a viewpoint of strength. The synthetic pulp which is below 10 in freeness is preferably used.

It is preferable that the film layer 1a has a mixing ratio of the inorganic powder material of 20–60% by weight, the synthetic organic fiber material of 10–30% by weight and the synthetic organic pulp binder material of 30–50% by weight. It is preferable that the coarse paper layer 1b has its mixing ratio comprised of the synthetic organic fiber material of 20–60% by weight and the synthetic organic pulp binder material of 40–80% by weight. The paper layer 1a in the foregoing mixing ratio provides good microporous properties, good oxidation resisting properties and good thermal fusion adhesion properties, caused by the thermal fusion of the synthetic pulp between the fibers and the two paper layers. The coarse paper layer 1b in the foregong mixing ratio provides the advantage that the electric resistance value of the envelope separator can be kept small due to the fact that the layer 1b is comparatively large in pore diameter and good in electrolyte permeability. The unit amount of the coarse paper layer 1a is preferably 10–100 g/m$^2$, since there is a tendency that the tearing strength of the thermal fusion adhesion portion is lowered if the unit amount is below 10 g/m$^2$, and the electric resistance of the separator is liable to become too high if the unit amout is about 100 g/m$^2$.

The envelope type separator of the present invention having the foregoing construction may be manufactured by any desired method. For instance, for making a combination-paper type separator sheet, a microporous paper layer which has been previously prepared and dried is used as a raw material, and thereafter the dried paper layer and the coarse paper layer in wet condition are combined together by a paper-making process and are adhered together by heating. This, however, is defective in that the sheet is liable to be largely warped or to be remarkably wrinkled, when subjected to the heating treatment, thus resulting in a separator which has a lowered peeling strength between the layers. Accordingly, it is desirable that a paper type separator sheet is produced which is free from occurrence in warp and wrinkles as noted above and is high in peeling strength between the layers. By using a separator sheet formed from the raw material used in this invention, an envelope type separator is prepared which fills this need.

This invention also provides a manufacturing process which meets this desire, and it is characterized in that a wet microporous paper layer, made of a mixtureof an inorganic powder material, a synthetic fiber material and synthetic pulp material and a second, wet coarse paper layer which is made of a mixture of synthetic fiber material and a synthetic pulp material, and which contains no inorganic powder material, are combined together by a paper-making process and the resultant combination-paper type wet sheet is heated so that both a drying treatment, and a binding treatment through fusion of the synthetic pulp materials, may be carried out, whereby there is produced a combination-paper type separator sheet, which is an integral combination of the microporous paper layer containing the inorganic material, and the coarse paper layer containing no inorganic material, said coarse paper layer being comparatively large in pore diameter in porosity. The separator sheet thus prepared is so formed as to bring the mutually inward facing surfaces of the coarse paper layers, containing no inorganic powder material, together and adhering those surfaces together through melting of the pulp materials by thermal fusion at predetermined portions thereof, so that the sheet may be formed into the shape of an envelope.

The mutually inwardly facing surfaces of the coarse paper layer of the separator sheet as mentioned above can be established either by bending a single separator sheet or by using two separator sheets.

The manufacturing process of the invention is carried out in such a manner that the microporous paper layer and the coarse paper layer are combined together by a paper-making process in their respective wet conditions and are then subjected to heat treatment, so that each layer has, in its wet layer condition, such a loose structure that the synthetic fibers are not fixed together yet by binding of the pulps, and consequently a thermal shrinkage of the sheet caused at the time of heating can be absorbed in each of the layers and there is no or little occurrence in warping and wrinkles in the separator sheet. In this case, the synthetic resin of polyolefin series and the pulp of the same series are effective in greatly decreasing the amount of thermal shrinkage.

An embodying example of the process of this invention will be explained in detail with reference to FIG. 3 as follows:

There is provided a first paper-making tank 5 and a second paper-making tank 6, and any kind of a synthetic fiber material of the polyolefin series, a synethic pulp material which is lowr in melting point than the foregoing fiber material, and an inorganic powder material, are so charged into the first paper-making tank 1 as to have their respective proper amounts within the range of the mixing ratio noted above. These materials are mixed together by a conventional pulper or the like, and an anionic or cationic powder coagulent is added thereto, and the resultant mixture istreated by a first paper-making machine 7 so that a wet paper-making layer 1A formed thereby is transferred to an endless conveyor belt 8 made of wool or the like, arranged to turn in one direction. Additionally, a synthetic fiber material and a synthetic pulp material, which are substantially equal to those used as the raw materials for the foregoing wet microporous paper layer 1A, and charged into the 2nd paper-making tank 6 to have their respective proper amounts within the range of the mixing ratio noted above. These materials are mixed by a conventional pulper or the like, and thereafter the resultant mixture is treated by a 2nd paper-making machine 9 so that a wet coarse paper layer 1B obtained thereby with the traveling wet paper-making layer 1A on the conveyor belt 8. The resultant wet combination-paper type sheet is passed through a pair of pressing rollers 10, 10 for pressing, and thereby the close engagement between the two layers 1A, 1B is enhanced and at the same time is formed into a sheet of predetermined thickness. Then, the sheet travels in one direction and is dried under pressure contact using a series of hot cylinders, 11, 11, 11 heated to 110°–120° C. It is then heated to 130°–150° C. while travelling through a heating machine 12 at a speed of 20 m/min., whereby the synthetic pulp materials in the two layers 1A, 1B are fused to effect a binding treatment between the synthetic fiber materials and a binding treatment between the two layers. The paper type separator sheet 1 passed through the heating machine 12 is cut by a cutter 13 into sections, each being about twice as long as a length of a predetermined envelope to be produced. The combination-paper type separator sheet 1 of predetermined size is folded at its middle portion with the coarse paper layer 1B being located inside, so that the two coarse paper layers 1B, 1B are mutually facing each other, and put one upon another, and both side edge portions 2, 2 thereof are made to adhere to each other by thermal fusion of the pulps by means of a supersonic heating machine or the like, to obtain an envelope separator of this invention.

As occasion demands, a pair of pressing rollers 14, 14 are provided behind the hearing machine 12 so that the sheet may be passed therethrough for it to be additionally passed, and the pressing rollers 14, 14 may be ones for embossing the sheet so that, for instance, a number of parallel ribs are formed on the inner surfaces of the coarse layer thereof.

If, though not illustrated, a paper-making tank with a paper-making machine for a coarse paper layer is provided before the first paper tank 1 so that an additional coarse paper layer may be formed by a paper-making process, and is conveyed by the belt 8 for being then adhered to the microporous paper layer 1A, there is produced a combination-paper type separator wherein the microporous paper layer 1A has on its both side surfaces th coarse paper layers 1B combined therewith. Consequently, even if the separator is folded conveniently at its either side surface, or two separators are put one upon another, the coarse paper layers can be always put one upon another to face one another, and thus the manufacturing process of the envelope separator by means of thermal fusion adhesion can be facilitated.

This invention will be further explained with reference to examples described below. In any of these examples, the synthetic fiber material is 0.5 denier in thickness and 5 mm in length, the synthetic pulp material has a 0.5 melt-index, and the inorganic powder material is amorphous silica powder having a specific surface area of 200 $m^2/g$.

EXAMPLE 1

A mixture comprising polyester fiber of 10% by weight, polyethylene synthetic pulp of 30% by weight and amorphous silica powder of 60% by weight, and a second mixture comprising polyethylene synthetic fiber of 50% by weight and polyethylene synthetic pulp of 50% by weight are each made into paper layers and are combined together into a combination wet non-woven sheet by respective wet type paper-making machines, and the resultant wet sheet is then formed into one of a predetermined thickness by pressing. Thereafter, the sheet is dried by heating at 110°–120° C., and is then heated at a temperature of about 140° C. to effect the binding between the joined two layers through fusion of the synthetic pulp. There is thus produced a combination-paper type separator wherein the microporous paper layer of 100 g/m² in unit amount and the coarse paper layer of 50 g/m² in unit amount are integrated one with another. The combined layers are then passed through a treatment tank containing a penetrant and then is dried.

The resultant paper type separator sheet which is 0.4 mm in thickness and 150 g/m² in unit amount is cut into sections, each having a length which is about twice the length of an electrode plate It is then folded into two with the coarse layer being inside, and the opposite side edges of the sheet are adhered together through thermal fusion of the pulps by means of a supersonic heating machine. There is thus obtained an envelope type separator which is 0.4 mm in thickness and 150 g/m² in unit amount.

Comparative data for this example and those following are found in Table 1 below.

EXAMPLE 2

A mixture comprising polyethylene synthetic pulp of 40% by weight, polyester fiber of 20% by weight and amorphous silica powder of 40% by weight, and a second mixture comprising polyethylene synthetic pulp of 50% by weight and polyester fiber of 50% by weight are used as raw materials for paper making of a combination paper type sheet. By almost the same process as in Example 1, except for the above mixing preparation, there is produced an envelope type separator.

EXAMPLE 3

A mixture comprising polyethylene synthetic pulp of 50% by weight, polyester fiber of 30% by weight and amorphous silica powder of 20% by weight, and a second mixture comprising polyethylene synthetic pulp of 50% by weight and polyester fiber of 50% by weight are used. By almost the same process as in Example 1, except for the above mixing preparation, there is produced an envelope type separator.

EXAMPLE 4

A mixture comprising polyethylene synthetic pulp of 40% by weight, polyester fiber of 20% by weight and amorphous silica powder of 40% by weight and a second mixture comprising polyethylene synthetic pulp of 40% by weight and polyester fiber of 60% by weight are used. By almost the same process as in Example 1, except for the above mixing preparation, there is produced an envelope type separator.

EXAMPLE 5

A mixture comprising polyethylene synthetic pulp of 40% by weight, polyester fiber of 20% by weight an an amorphous silica powder of 40% by weight and a second mixture comprising polyethylene synthetic pulp of 60% by weight and polyester fiber of 40% by weight are used. By almost the same process as in Example 1, except for the above mixing preparation, there is produced an envelope type separator.

EXAMPLE 6

The same materials and the same mixing ratios as in Example 2 are used, and the microporous paper layer of 100 g/m² in unit amount is combined, on its side surfaces, with the respective coarse paper layers, each being 25 g/m² in unit amount. By almost the same process as in Example 1, except for the above, there is produced an envelope paper type separator.

EXAMPLE 7

Instead of the polyester fiber used in Example 2, acrylic fiber is used. By almost the same way as in Example 2, except for the above, there is produced an envelope paper type separator.

The combination-paper type separator in each of Examples 2–7 is 0.4 mm in thickness and 150 g/m² in unit amount, and is equal to that in Example 1.

As a Reference Example, the same raw materials as used in the above Examples are used and an envelope paper type separator is manufactured by the following process.

REFERENCE EXAMPLE

A mixture comprising polyester fiber of 20% by weight, polyethylene synthetic pulp of 40% by weight and amorphous silica powder of 40% by weight is prepared, and a wet paper sheet is produced therefrom by a conventional wet type paper-making process. After being pressed into a sheet having a predetermined thickness, the same is dried by heating at 110°–120° C., and is then heated at a temperature of 140° C. for effecting the binding between the fibers by means of fusion of the synthetic pulp, so as to obtain a paper type separator sheet of 100 g/m² in unit amount and 0.4 mm in thickness. In almost the same manner as in Example 1, the sheet is cut into sections, each having a predetermined length, and the sheet of predetermined size is folded into two. Both side edges of the mutually facing inner surface thereof are adhered together through thermal fusion of the pulp by means of a supersonic heating machine to obtain an envelope paper type separator of 0.4 mm in thickness and 150 g/m² in unit amount.

The envelope paper type separators of this invention produced as above and that produced in the Reference Example are measured on various properties at thermal fusion adhesion portions and others to obtain the resultant data shown on the following Table 1.

As will be clear from the above, envelope paper type separators of the present invention are all excellent in that the peeling strength (in other words, friction pull strength or an adhesion strength) at their thermal fusion adhesion portion is remarkably increased, and in other physical properties. Furthermore, the electric resistance thereof are substantially equal or below that of the Reference Example product, that is, the envelope paper separator containing the inorganic powder material.

TABLE 1

| | Electric resistance Ω/dm²/sheet | Tearing strength g · cm | Folding strength (load 300 g) number of times | Peeling strength of fusion adhesion portion kg/cm | Peeling strength between layers kg/cm | Occurrence in warp wrinkles |
| --- | --- | --- | --- | --- | --- | --- |
| Example 1 | 0.0006 | 160 | 1800 | 1.0 | 0.5 | no |
| Example 2 | 0.0008 | 220 | 3000 up | 1.0 | 0.6 | no |

TABLE 1-continued

|  | Electric resistance Ω/dm²/sheet | Tearing strength g·cm | Folding strength (load 300 g) number of times | Peeling strength of fusion adhesion portion kg/cm | Peeling strength between layers kg/cm | Occurrence in warp wrinkles |
| --- | --- | --- | --- | --- | --- | --- |
| Example 3 | 0.0012 | 250 | 3000 up | 1.0 | 0.6 | no |
| Example 4 | 0.0007 | 230 | 3000 up | 0.7 | 0.5 | no |
| Example 5 | 0.0013 | 250 | 3000 up | 1.2 | 0.6 | no |
| Example 6 | 0.0006 | 210 | 3000 up | 0.9 | 0.6 | no |
| Example 7 | 0.0008 | 215 | 3000 up | 1.0 | 0.6 | slight |
| Reference Example | 0.0012 | 100 | 47 | 0.3 |  | slight |

Here, method for measuring the above various properties are as follows:
Electric resistance - under JIS C 2313 Tearing strength - under JIS P8116
Folding strength - JIS P8115 Peeling strength - Pull strength of the test piece of 3 m/m in width and 1 cm in length after fusion adhesion Next, for proving the effect of the manufacturing process of this invention, control examples of manufacturing processes are described below and various properties of the products thereof are shown in Table 2.

CONTROL EXAMPLE 1

A dried coarse paper layer of polypropylene fiber previously manufactured is combined by a paper-making process, with a wet paper layer made by a paper-making machine, using a mixture comprising polyester fiber of 20% by weight, polyethylene pulp of 40% by weight and amorphous silica powder of 40% by weight, which are the same materials as those in the Example 1. The resultant combination-paper type sheet is dried and adhered between the layers through fusion of the pulp by heating at 140° C. to obtain a combination-paper type separator which is of 0.4 mm in thickness and 150 g/m² in unit amount and comprises a mutually integral one of a microporous paper layer of 100 g/m² in unit amount and a coarse paper layer of 50 g/m² in unit amount. In almost the same manner as in the Example 1, the sheet is cut and each one is folded into two with the coarse paper layer being inside and both side edges thereof are adhered by thermal fusion by means of a supersonic heating machine to produce an envelope type separator.

CONTROL EXAMPLE 2

For increasing the peeling strength between the layers of the product in the Control Example 1, before being subjected to the heat treatment of 140° C., the combination-paper type sheet is impregnated with acrylic resin emulsion liquid, so that the acrylic resin is adhered thereto in the ratio of its 20 parts thereof to 100 parts of the sheet. By almost the same process as in the Control Example 1, except for the above, there is produced an envelope type separator of 0.4 mm in thickness and 168 g/m² in unit amount.

Various properties of the products of these Control Examples 1 and 2 are shown in the following Table 2.

As will be clear from the Table 2, the envelope type separator of Control Example 1 can be increased in its peeling strength at the thermal fusion adhesion portion, without being increased in electric resistance, but this is disadvantageous in that warp and wrinkles are remarkably caused. The product of the Control Example 2 is not good because the electric resistance is far beyond 0.0015 which is suitable for practical use.

This means that it is significant in the manufacturing process of this invention that the microporous paper layer and the coarse paper layer are combined together under the condition that they are both in the form of wet layers, and it has been confirmed that, by this process, a combination-paper type separator can be manufactured in such a state that the peeling strength between the layers is increased and there is no or little occurrence in wrinkles and warp. As a result thereof, there can be produced an envelope type separator of good quality.

TABLE 2

|  | Electric resistance Ω/dm²/sheet | Tearing strength g·cm | Folding strength number of times | Peeling strength at adhesion portion kg/cm | Peeling strength between the layers kg/cm | Occurrence in warp, wrinkles |
| --- | --- | --- | --- | --- | --- | --- |
| Control Example 1 | 0.0008 | 190 | 3000 up | 1.0 | 0.1 | yes |
| Control Example 2 | 0.0035 | 310 | 3000 up | 1.1 | 0.3 | yes |

Thus, the envelope type separator of this invention comprises such an integral combination-paper type separator sheet that a microporous paper layer containing an inorganic powder material and a coarse paper layer containing no inorgaic power material are combined together by a paper-making process. In addition, they are bound together by heating, and the foregoing separator sheet is formed into an envelope by the adhering of the mutually inward facing surfaces of the coarse paper layers thereof, by a thermal fusion adhesion, so that as compared with a conventional separator, the separator of the present invention comprises a microporous paper layer containing the inorganic powder material and is formed into the shape of an envelope by adhering the mutually inward facing surfaces thereof together by thermal fusion. The peeling strength at the thermal fusion adhesion portion thereof is greatly increased, the folding strength thereof is improved, and an increase in the electric resistance can be prevented, thus affording an envelope type separator which is stable, durable, tough and will have a long life of use.

In the manufacturing process thereof, the microporous paper layer containing the inorganic powder material which is in its wet condition and the coarse paper layer containing no inorganic powder material which is also in its wet condition are adhered together by a wet type paper-making process, which is thereafter subjected to heat treatment, so that there is no or little occurrence in warping and wrinkles. Thus, the envelope type separator sheet which results is increased in peeling strength between the layers, and the manufacturing work becomes smooth with a good increase in efficiency.

We claim:

1. A process for preparing an envelope type separator for a storage battery which comprises:
   (a) forming a wet microporous paper layer from an aqueous slurry of a mixture of an inorganic powder material, a synthetic organic fiber material, and a synthetic organic pulp material;
   (b) forming a wet course paper layer from an aqueous slurry of a mixture of a synthetic organic fiber material, and a synthetic organic pulp material that contains no inorganic powder material;
   (c) combining said wet microporous paper layer and said wet coarse paper layer together by a paper making process;
   (d) heating the resultant combination-paper type wet sheet to effect drying and binding the two paper layers thereof together through fusion of the synthetic pulp materials thereby producing a combination-paper type separator sheet, said combination-paper type separator sheet being an integral combination of the microporous paper layer containing the inorganic powder material and the coarse paper layer containing no inorganic powder material, said course paper layer being comparatively large in pore diameter and thus in porosity;
   (e) arranging said separator sheet so that the mutually inward facing surfaces of the coarse paper layer are placed one upon another; and
   (f) adhering the mutually inward facing surfaces of the coarse paper layer together by melting the synthetic pulp materials by thermal fusion at predetermined locations thereof so that the separator sheet is formed into the shape of an envelope.

* * * * *

UNITED STATES PATENT AND TRADEMARK OFFICE
CERTIFICATE OF CORRECTION

PATENT NO. : 4,818,340

DATED : April 4, 1989

INVENTOR(S) : Takao Hasegawa

It is certified that error appears in the above-identified patent and that said Letters Patent is hereby corrected as shown below:

Cover Page, [30], Foreign Application Priority Data, delete "52-122175", insert -- 57-122175 --.

Signed and Sealed this

Twelfth Day of December, 1989

*Attest:*

JEFFREY M. SAMUELS

*Attesting Officer*     Acting Commissioner of Patents and Trademarks